No. 741,348. PATENTED OCT. 13, 1903.
O. A. LANE.
COOKING UTENSIL.
APPLICATION FILED OCT. 7, 1902.
NO MODEL.

WITNESSES.
O. B. Barnziger.
M. M. Struble.

INVENTOR.
Oscar A. Lane
By Newell S. Wright.
his Attorney

No. 741,348. Patented October 13, 1903.

UNITED STATES PATENT OFFICE.

OSCAR A. LANE, OF ADRIAN, MICHIGAN, ASSIGNOR OF ONE-HALF TO CHARLES B. PENNOCK, OF ADRIAN, MICHIGAN.

COOKING UTENSIL.

SPECIFICATION forming part of Letters Patent No. 741,348, dated October 13, 1903.

Application filed October 7, 1902. Serial No. 126,274. (No model.)

*To all whom it may concern:*

Be it known that I, OSCAR A. LANE, a citizen of the United States, residing at Adrian, county of Lenawee, State of Michigan, have invented a certain new and useful Improvement in Cooking Utensils, of which the following is a specification, reference being had to the accompanying drawings, which form a part of this specification.

My invention has for its object certain new and useful improvements in cooking utensils, the same having more especial reference to pie-tins, bread-tins, and analogous articles.

The purpose of my invention is to provide cooking utensils of this class so constructed as to prevent the burning on the bottom of the articles being baked in such tins, my object being also to secure a more even bake through bread, pie, cake, or other article being baked.

My invention consists of the construction and combination of devices hereinafter described and claimed, and illustrated in the accompanying drawings, in which—

Figure 1:
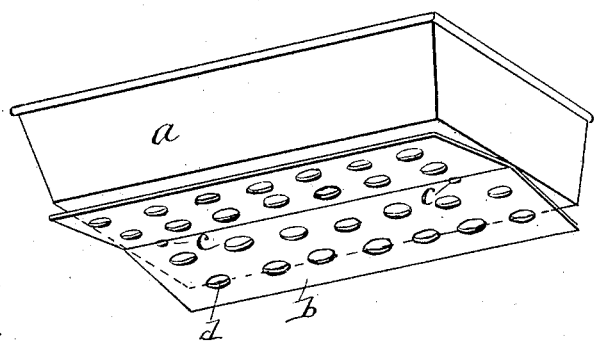
Figure 2:
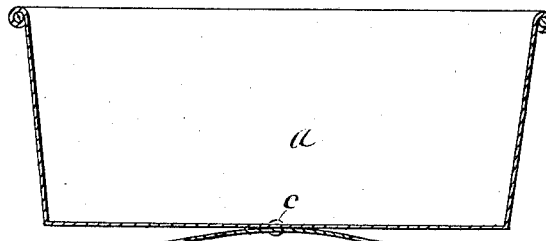
Figure 3:
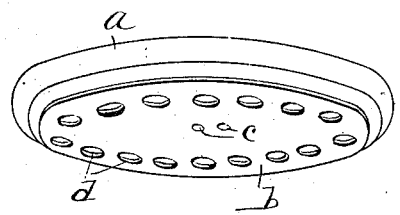
Figure 4:
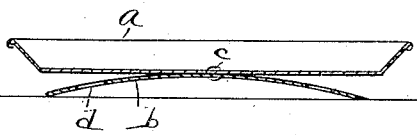

Figure 1 is an inverted perspective showing a pie-tin. Fig. 2 is a vertical section thereof. Fig. 3 is an inverted perspective of a bread-tin. Fig. 4 is a vertical section thereof.

I carry out my invention as follows:

As illustrated in the drawings, $a$ denotes any suitable cooking utensil—as a pie, cake, or bread tin, for example. This utensil may be constructed in any desired form. Attached to the base thereof or to its under surface is a bottom $b$, which may be attached to the under surface of the cooking utensil in any desired manner—as, for example, by one or more rivets $c$. This bottom may be constructed of any desired form to correspond with the form of the cooking utensil to which it is attached. The bottom is so constructed that its outer edges are spaced from the adjacent surface of the cooking utensil. In a round cooking utensil the under surface of the bottom may be concaved. In cooking utensils of other shapes—as in a square-cornered utensil, for example—the lateral edges of the bottom may be made flaring—as shown, for example, in Figs. 3 and 4. The bottom is preferably constructed with a series of holes, (indicated at $d$,) through which the heat may pass. This bottom can be used on all articles of this class and can be attached to enamel or granite ware as well as to tinware used in ovens.

The efficiency and utility of my invention are apparent.

I do not limit myself to engaging the bottom centrally to the under surface of the utensil, as it may be attached thereto in any desired manner and spaced therefrom at any desired point.

What I claim as my invention is—

1. The combination with a cooking utensil of a bottom secured to the under surface of said utensil and having its edges diverging from the middle of the base of the cooking utensil.

2. The combination with a cooking utensil of a bottom secured to the under surface of the cooking utensil, said bottom centrally contacting with the base of the cooking utensil and diverging outwardly from the center of the base of said utensil.

3. The combination with a cooking utensil of a bottom centrally secured to the under surface of the utensil, said bottom flaring downwardly from the center to the edge thereof.

In testimony whereof I have signed this specification in the presence of two subscribing witnesses.

OSCAR A. LANE.

Witnesses:
CLARKE E. BALDWIN,
C. L. ROBERTSON.